United States Patent [19]

Kim

[11] Patent Number: 5,430,493
[45] Date of Patent: Jul. 4, 1995

[54] MANUFACTURERS OR USERS ON-SCREEN GRAPHIC DISPLAY UPON POWER-OFF OF A TELEVISION RECEIVER

[75] Inventor: Dong G. Kim, Suweon, Rep. of Korea

[73] Assignee: Samsung Electronics Co., Ltd., Kyungki, Rep. of Korea

[21] Appl. No.: 897,061

[22] Filed: Jun. 11, 1992

[30] Foreign Application Priority Data

Jun. 11, 1991 [KR] Rep. of Korea .................. 91-9585

[51] Int. Cl.$^6$ .............................................. H04N 5/445
[52] U.S. Cl. .......................................... 348/564; 348/730
[58] Field of Search ................. 358/190, 194.1, 183, 358/188, 22, 182; H04N 5/44, 5/445, 5/262, 5/272; 340/721; 348/563–565, 569–570, 730, 734

[56] References Cited

U.S. PATENT DOCUMENTS

| 3,868,675 | 2/1975 | Firmin | 340/802 |
| 4,344,090 | 8/1982 | Belisomi et al. | 358/183 |
| 4,459,585 | 7/1984 | Pasternak | 358/183 |
| 4,616,261 | 10/1986 | Crawford et al. | 358/183 |
| 4,633,297 | 12/1986 | Skerlos et al. | 358/183 |
| 4,760,391 | 7/1988 | Gries | 358/183 |
| 4,959,720 | 9/1990 | Duffield et al. | 358/191.1 |
| 5,153,580 | 10/1992 | Pollack | 358/194.1 |
| 5,194,951 | 3/1993 | Hailey et al. | 358/182 |
| 5,233,423 | 8/1993 | Jernigan et al. | 348/56.4 |

FOREIGN PATENT DOCUMENTS

| 0300680 | 12/1988 | Japan | H04N 5/445 |
| 4037271 | 2/1992 | Japan | H04N 5/445 |

Primary Examiner—Victor R. Kostak
Assistant Examiner—John W. Miller
Attorney, Agent, or Firm—Sughrue, Mion, Zinn, Macpeak & Seas

[57] ABSTRACT

A message displaying method upon power-off of a television is adapted to delay power-off execution for a few seconds while performing an OSD, in which the OSD message is stored in a microprocessor under the control of a designated program of the microprocessor so that a company can transmit advertising messages to the viewer whenever the users power off their televisions.

5 Claims, 4 Drawing Sheets

MANUFACTURERS OR USERS ON-SCREEN GRAPHIC DISPLAY UPON POWER-OFF OF A TELEVISION RECEIVER

BACKGROUND OF THE INVENTION

The present invention relates to an on screen display (hereinafter, termed "OSD") of a television (hereinafter, termed "TV"), and more particularly to, a message displaying method upon power-off of a television adapted to transmit messages such as an advertisement by displaying a manufacturer's advertisement as an OSD or an informational message as an OSD for a few seconds before complete power-off of the television.

Conventional TVs have a function for displaying the channel state, the fineness of tuning, and the level of volume and so on, but such a function is limited to only a power-on state of the television since the OSD function is stopped with the actuation of the power-off button of the television simultaneously.

U.S. Pat. No. 4,616,261 discloses a general purpose computer having a program for displaying a subliminal message, the computer being connected separately to a television and periodically switched on or off for repeated operation to display the subliminal message during a normal displaying operation of a television for a short time, thereby obtaining self-recognizing effects. However, such a system still has a problem in that an informational message or a manufacturer's advertisement can not be displayed with the already existing OSD of the TVs.

SUMMARY OF THE INVENTION

The present invention overcomes these problems and provides a message displaying method upon power-off of a television adapted to conveniently transmit a message such as an advertisement to TV viewers for several seconds when the picture of the TV is switched off and before the TV power is switched off.

A message displaying method upon power-off of a television according to the present invention comprises the steps of discriminating whether said television is in a picture-on mode when said television is turned on, deciding whether a key of a user's OSD is pressed or not if said television is in said picture-on mode, setting said user's OSD if said key input for said user's OSD is pressed, performing normal operations, performing a manufacturer's OSD or said user's OSD for several seconds if said picture-on mode is not realized in said discriminating step, and then executing power-off of said television.

Other objects and features of the present invention will become more apparent from a consideration of the following description which proceeds with reference to the accompanying drawings in which a selected example embodiment is illustrated by way of example, and not by way of limitation.

DETAILED DESCRIPTION OF THE PREFERRED EMBODIMENT

Now, the present invention will be described in detail below with reference to the appended drawings.

Figure 1A:
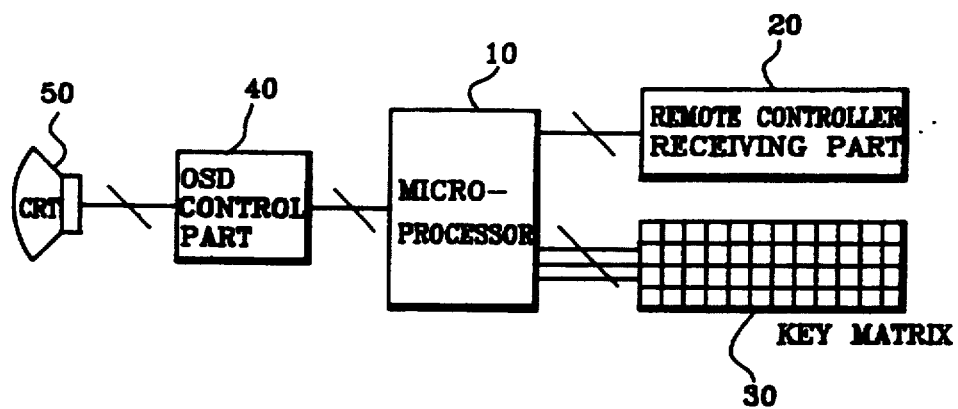
FIG. 1A and 1B are high and low level schematic diagrams, respectively, showing the construction of a conventional digital TV.

FIG. 1A is a schematic diagram showing the hardware construction of a conventional digital TV. In such a conventional digital TV, a remote controller receiving part 20 receives signals from a remote controller and transmits them to a microprocessor 10 and a key matrix 30 provides various function commands and OSD message information to the microprocessor 10. These are connected to inputs of the microprocessor 10 controlling the system.

On the other hand, an OSD control part 40 is connected to an output of the microprocessor 10, and thus characters and the like are displayed on a cathode ray tube (hereinafter, termed "CRT") 50 under the control of the microprocessor 10.

Figure 1B:
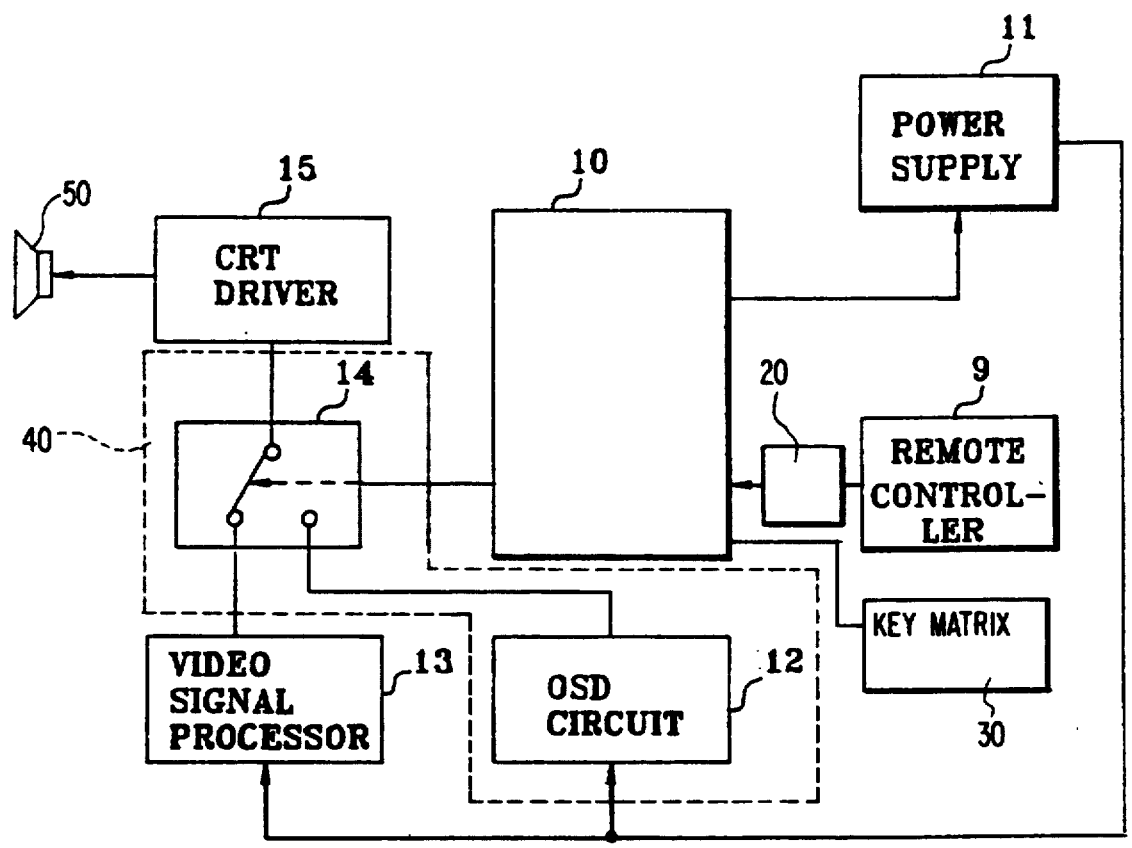

The microprocessor 10 controls the OSD control part 40 according to signals applied from the remote controller receiving part 20 and the key matrix 30 by the operation of an inner OSD circuit. It will be noted that microprocessor 10 provides control signals to, e.g., a power supply part 11, as shown in greater detail in FIG. 1B.

The present invention is adapted to add a control program for realizing the message displaying method of the invention to the conventional TV hardware construction as described above.

Figure 2A:
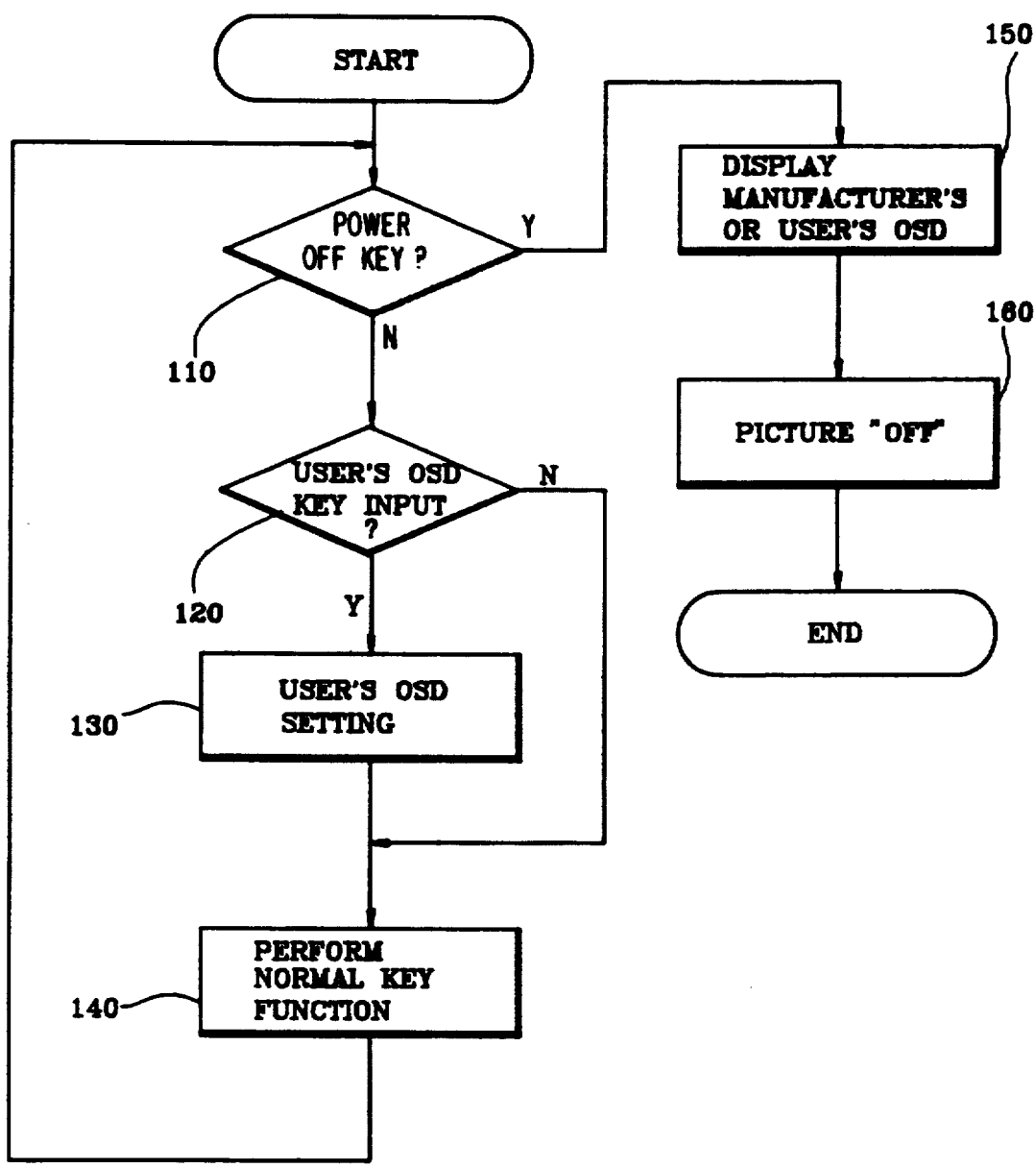
FIG. 2A and 2B are overall and detailed flow charts, respectively, which are useful in explaining various steps used in a message upon power-off of a television according to the present invention.
Figure 2B:
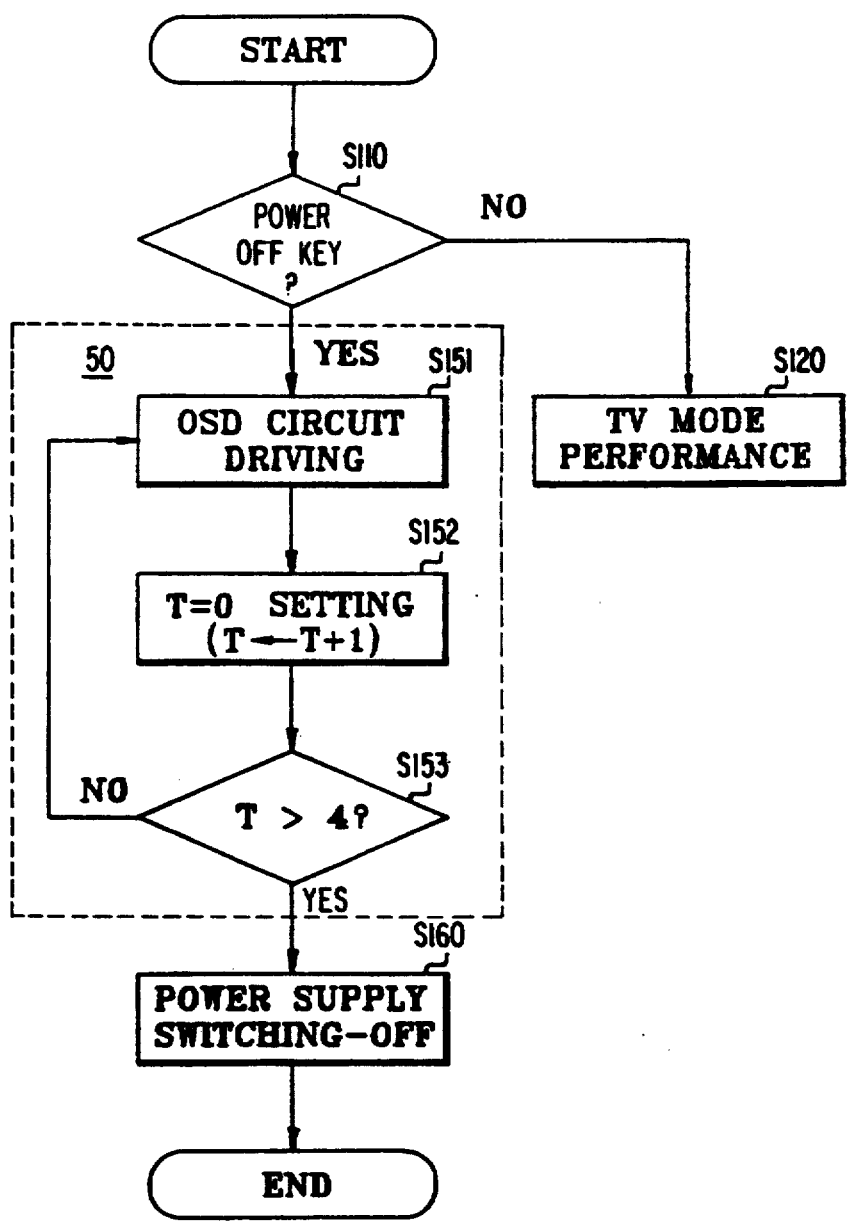

FIG. 2A is a flow chart for explaining the control program according to the present invention.

The control program according to the present invention comprises a step 110 for discriminating whether or not a TV is receives a control signal corresponding to a power-off key, a step 120 for deciding whether or not the control signals correspond to a user's OSD is received when the control signal does not correspond to the power-off key in the previous step, a step 130 for setting the user's OSD if pressed in the previous step, a step 140 for performing the normal operation of the TV subsequently, a step 150 for performing a manufacturer's OSD or the user's OSD for several seconds if the power-off key is not pressed at the first step 110, and a step 160 for executing the power-off thereafter.

Now, the operation of a message displaying method upon power-off of a television according to the present invention will be described.

A manufacturer's OSD or a user's OSD (the user's OSD relates to informational data of interest to the user) are not performed during the display of a normal television program, and, at this time, the user can input and store a desired message, that is, the user can store desired OSD information into a microprocessor 10 via a key matrix 30 for later displaying. This corresponds to steps 120 and 130.

In the case of the manufacturer's OSD, since the OSD character information is stored into the microprocessor during manufacture, a message input operation is not required.

As the first stage of the operation, the microprocessor 10 discriminates whether or not a TV is in its picture "on" state of power "on" by a step 110. That is, the microprocessor checks to see whether or not a TV picture being displayed on the screen is being turned off.

The microprocessor 10 next decides whether a key of the user's OSD is pressed or not at the step 120 if in its picture "on" state (that is, it is checked whether a user is inputting information to be displayed via the OSD), and accordingly sets the user's OSD character information input by the step 130 if pressed, and then performs normal functions of a key which has been pressed by the step 140 if the OSD key is not pressed.

Figure 3:
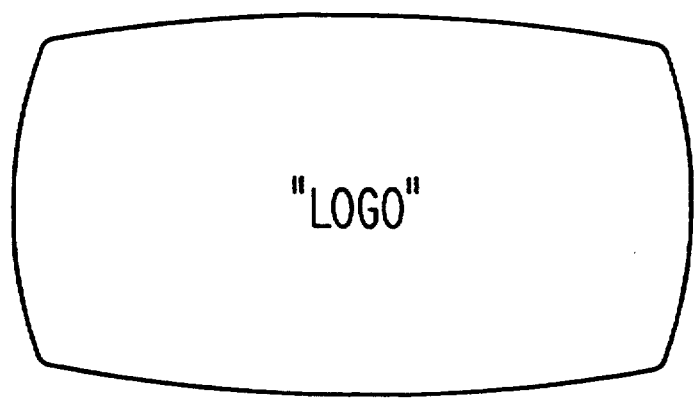
FIG. 3 shows a preferred embodiment of displaying a manufacturer's OSD according to the present invention.

If not in its picture "on" state at the first step 110, that is, if in its picture-off state at a step 110, the microprocessor 10 delays power-off for several seconds and provides the user's OSD message or the manufacturer's OSD message, which has been stored, to a CRT 50 via an OSD control part 40 to display the message. FIG. 3 shows an example of the manufacturer's OSD display accomplished according to the present invention. The power-off to the TV is finally performed by the step 160 after displaying the OSD characters for several seconds, thereby completing the program.

In performing the method of the present invention, the user can easily input the OSD message by utilizing the general remote controller, and the pre-stored manufacturer's OSD can contain an advertisement of the product, or a trademark so as to greatly save on advertisement costs and to obtain an advertisement effect without selling the products.

Further, if the user's OSD includes information necessary to carrying out home affairs, the user can receive the OSD message from a CRT while watching a TV, thereby repeatedly reminding the user of easily forgettable information.

Thus according to a message displaying method upon power-off of a television of the invention, a company can transmit advertising messages and the like to TV viewers without separate cost every time the user turns the power switch off, obtaining an advertisement effect continuously, while a user can obtain a continuously reminding effect for important information.

In the case that the present invention is applied to a monitor of a personal computer, information concerning the upkeep and maintenance of the monitor or a user's schedule of work can be displayed.

The present invention is no way limited to the embodiment described hereinabove. Various modifications of disclosed embodiment of the present invention will become apparent to persons skilled in the art upon reference to the description of the present invention. Therefore, the appended claims will cover any such modifications or embodiments as fall within the true scope of the present invention.

What is claimed is:

1. A message displaying method for displaying a message freely selected from one of a user-defined on-screen display (OSD) message and advertising information on a television screen of a television including a microprocessor and an OSD circuit upon setting a power-off condition, said method comprising the steps of:
receiving in said microprocessor a control signal for initiating a power off condition in said television;
displaying using said OSD circuit said message on said television screen for a predetermined period of time responsive to said microprocessor; and
executing power off of said television.

2. The message displaying method recited in claim 1, wherein said message is a user-defined OSD message and wherein said method further comprises the step of recording said user-defined OSD message responsive to OSD signals applied to said microprocessor prior to performing said receiving step.

3. A message displaying method for displaying a message freely selected from one of a user-defined on-screen display (OSD) message and advertising information on a television screen of a television including a microprocessor and an OSD circuit upon setting a power-off condition, said method comprising the steps of:
receiving a control signal for controlling said television;
when said control signal is associated with an OSD function, performing said OSD function;
when said control signal corresponds to a power off command, displaying said message on said television screen for a predetermined period of time; and
executing power off of said television.

4. The message displaying method recited in claim 3, wherein said message is a user-defined OSD message and wherein said performing step further comprises performing said OSD function so as to record said user-defined OSD message.

5. A message displaying method for displaying a message freely selected from one of a user-defined on-screen display (OSD) message and advertising information on a television screen of a television including a microprocessor and an OSD circuit upon setting a power-off condition, said method comprising the steps of:
receiving a control signal for controlling said television at said microprocessor;
when said control signal is associated with an OSD function, performing said OSD function for generating and storing a user-defined OSD message displayable on said television screen by said OSD circuit responsive to said microprocessor;
when said control signal corresponds to a power off command, discontinuing display of a television program on said television screen responsive to said microprocessor, displaying said user-defined message on said television screen for a predetermined period of time and executing power off of said television.

* * * * *